US011110916B2

(12) United States Patent
Park et al.

(10) Patent No.: US 11,110,916 B2
(45) Date of Patent: Sep. 7, 2021

(54) IMPACT-ABSORBING APPARATUS AND METHOD FOR VEHICLE

(71) Applicant: MANDO CORPORATION, Gyeonggi-do (KR)

(72) Inventors: Seung Bum Park, Gyeonggi-do (KR); Man Bok Park, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 322 days.

(21) Appl. No.: 15/702,761

(22) Filed: Sep. 13, 2017

(65) Prior Publication Data

US 2018/0072312 A1    Mar. 15, 2018

(30) Foreign Application Priority Data

Sep. 13, 2016 (KR) .......................... 10-2016-0118400
Oct. 7, 2016 (KR) .......................... 10-2016-0129606

(51) Int. Cl.
*B60W 30/085* (2012.01)
*B60W 30/095* (2012.01)
(Continued)

(52) U.S. Cl.
CPC .......... *B60W 30/085* (2013.01); *B60W 10/04* (2013.01); *B60W 10/18* (2013.01);
(Continued)

(58) Field of Classification Search
CPC .............................. B60W 30/085; B60W 10/18
See application file for complete search history.

(56) References Cited

U.S. PATENT DOCUMENTS 9,701,307 B1 *   7/2017  Newman ............... B60W 10/20
10,065,638 B1 *  9/2018  Wood .................. B60W 50/082
(Continued)

FOREIGN PATENT DOCUMENTS

CN     102762436     10/2012
CN     103842228     6/2014
(Continued)

OTHER PUBLICATIONS

Office Action dated Nov. 26, 2019 for Chinese Application No. 201710823149.3 and its English machine translation by Google Translate.
(Continued)

*Primary Examiner* — Jess Whittington
(74) *Attorney, Agent, or Firm* — Ladas & Parry, LLP

(57) ABSTRACT

Disclosed herein are an impact-absorbing apparatus and method for a vehicle, which are applied to an automatic emergency brake (AEB) system of a vehicle. The impact-absorbing apparatus includes a path generation unit configured to generate an own vehicle travel path of an own vehicle, based on a speed and travel direction of the own vehicle, and a preceding vehicle travel path of a preceding vehicle, based on a speed and travel direction of the preceding vehicle, and a collision determination unit configured to determine whether or not the own vehicle collides with the preceding vehicle, based on the own vehicle travel path and the preceding vehicle travel path, wherein when it is impossible to avoid the collision between the own vehicle and the preceding vehicle, the path generation unit generates a new travel path by comparing the own vehicle travel path with the preceding vehicle travel path.

6 Claims, 9 Drawing Sheets

(51) Int. Cl.
*B60W 30/09* (2012.01)
*B60W 10/04* (2006.01)
*B60W 10/18* (2012.01)
*B60W 10/20* (2006.01)

(52) U.S. Cl.
CPC ............ *B60W 10/20* (2013.01); *B60W 30/09* (2013.01); *B60W 30/095* (2013.01); *B60K 2370/175* (2019.05); *B60W 2540/00* (2013.01); *B60W 2554/4041* (2020.02); *B60W 2554/801* (2020.02); *B60W 2554/804* (2020.02)

(56) References Cited

U.S. PATENT DOCUMENTS

| | | | | | |
|---|---|---|---|---|---|
| 2008/0255729 | A1* | 10/2008 | Ichinose | ............... | B62D 15/025 701/42 |
| 2009/0037055 | A1* | 2/2009 | Danner | ............... | B60R 21/0134 701/45 |
| 2009/0192683 | A1* | 7/2009 | Kondou | ............... | B60W 30/09 701/53 |
| 2011/0054756 | A1* | 3/2011 | Hecker | ............... | B60T 8/00 701/70 |
| 2012/0130629 | A1* | 5/2012 | Kim | ............... | B60W 30/0956 701/301 |
| 2013/0152569 | A1* | 6/2013 | Spieker | ............... | B60T 8/1755 60/327 |
| 2014/0058625 | A1* | 2/2014 | Sun | ............... | B60G 17/0162 701/38 |
| 2015/0266473 | A1 | 9/2015 | Hayasaka | | |
| 2015/0283999 | A1 | 10/2015 | Igarashi et al. | | |
| 2016/0121884 | A1* | 5/2016 | Ciotlos | ............... | B60W 30/095 701/41 |
| 2016/0200317 | A1* | 7/2016 | Danzl | ............... | B60W 10/18 701/25 |
| 2016/0207529 | A1 | 7/2016 | Crombez et al. | | |
| 2017/0043768 | A1* | 2/2017 | Prokhorov | ............... | B60W 30/0953 |

FOREIGN PATENT DOCUMENTS

| | | |
|---|---|---|
| CN | 104781867 | 7/2015 |
| CN | 104798124 | 7/2015 |
| CN | 105818770 | 8/2016 |
| CN | 105848980 | 8/2016 |
| EP | 1 718 491 | 7/2009 |

OTHER PUBLICATIONS

Notice of Allowance dated Apr. 28, 2020 for Chinese Application No. 201710823149.3 and its English machine translation by Google Translate.

* cited by examiner

[Fig. 1]
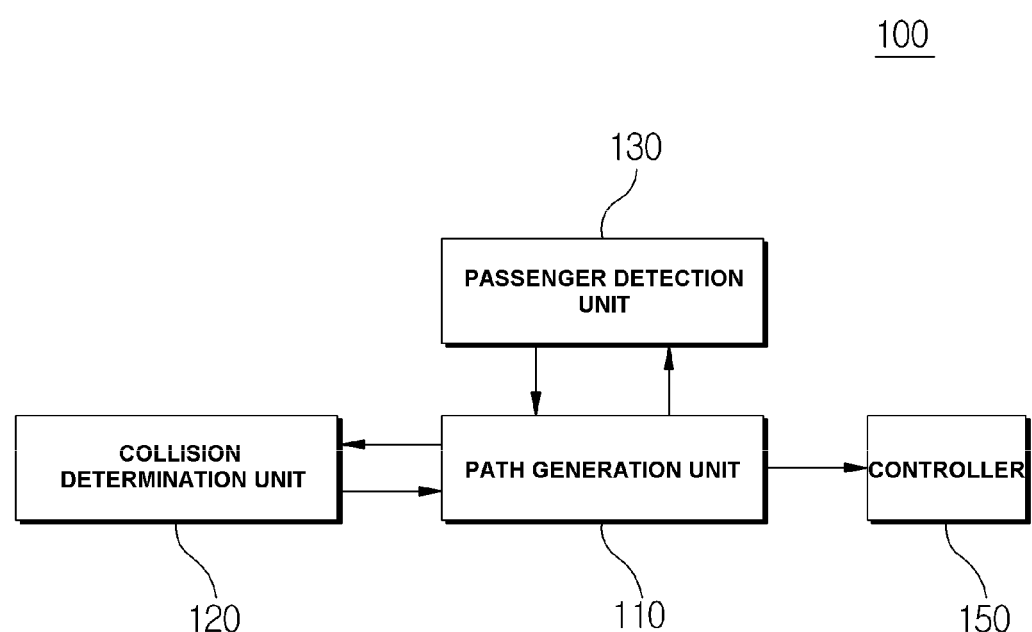

[Fig. 2]
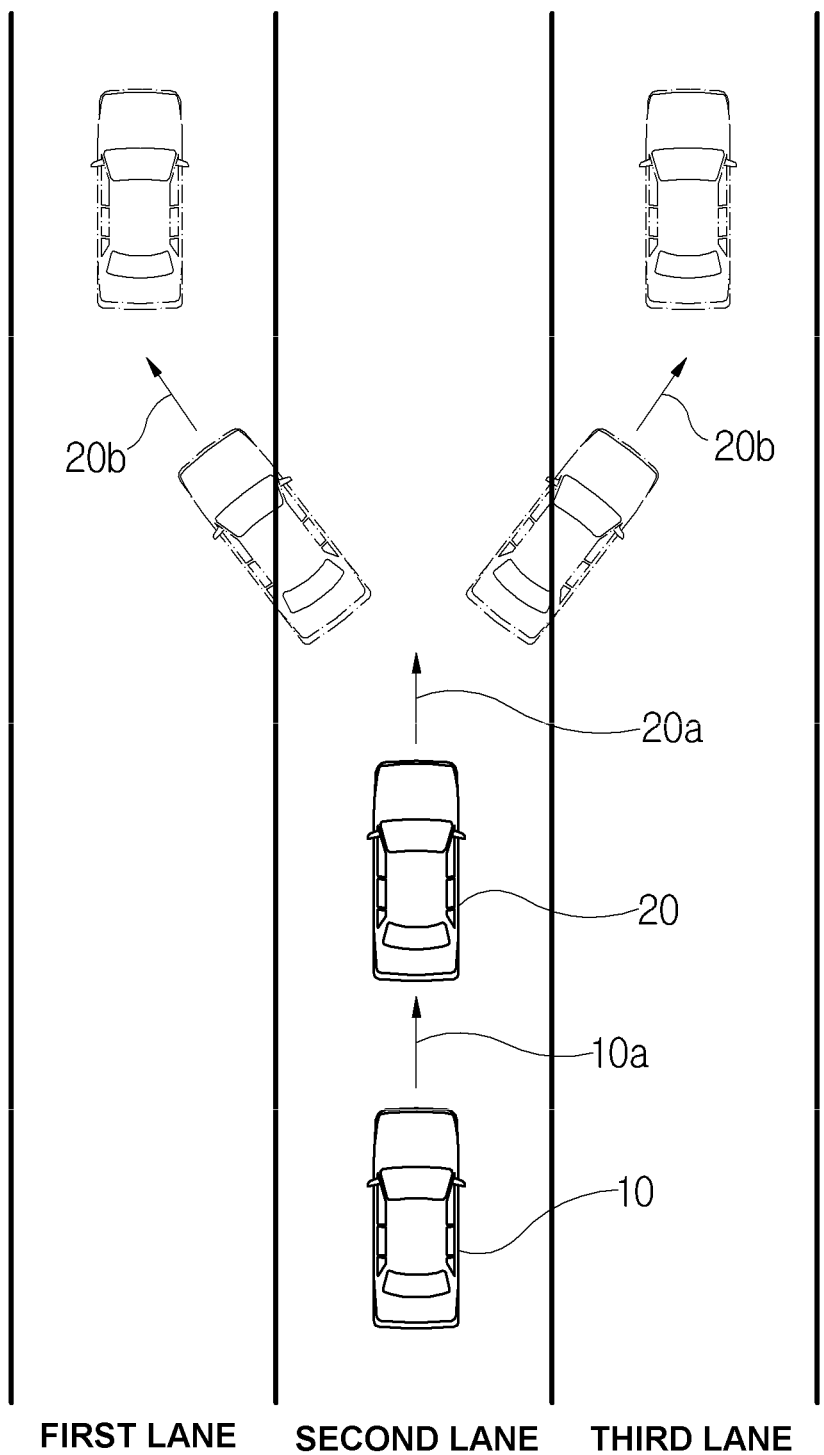

[Fig. 3A]
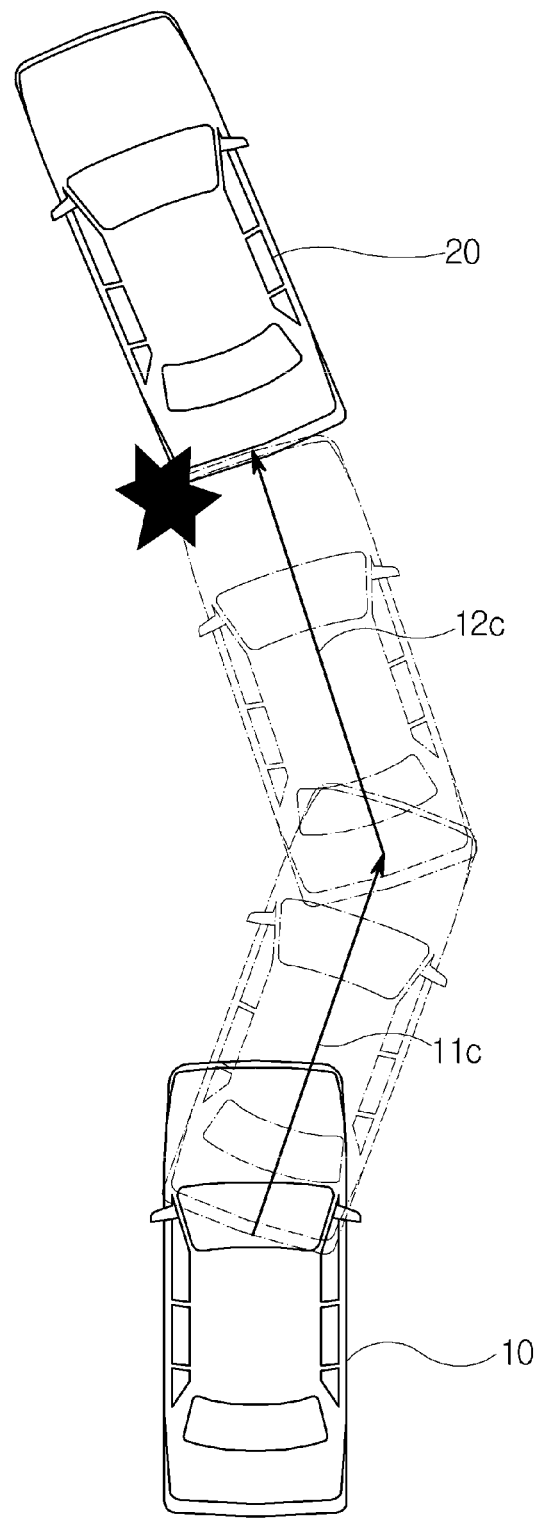

[Fig. 3B]
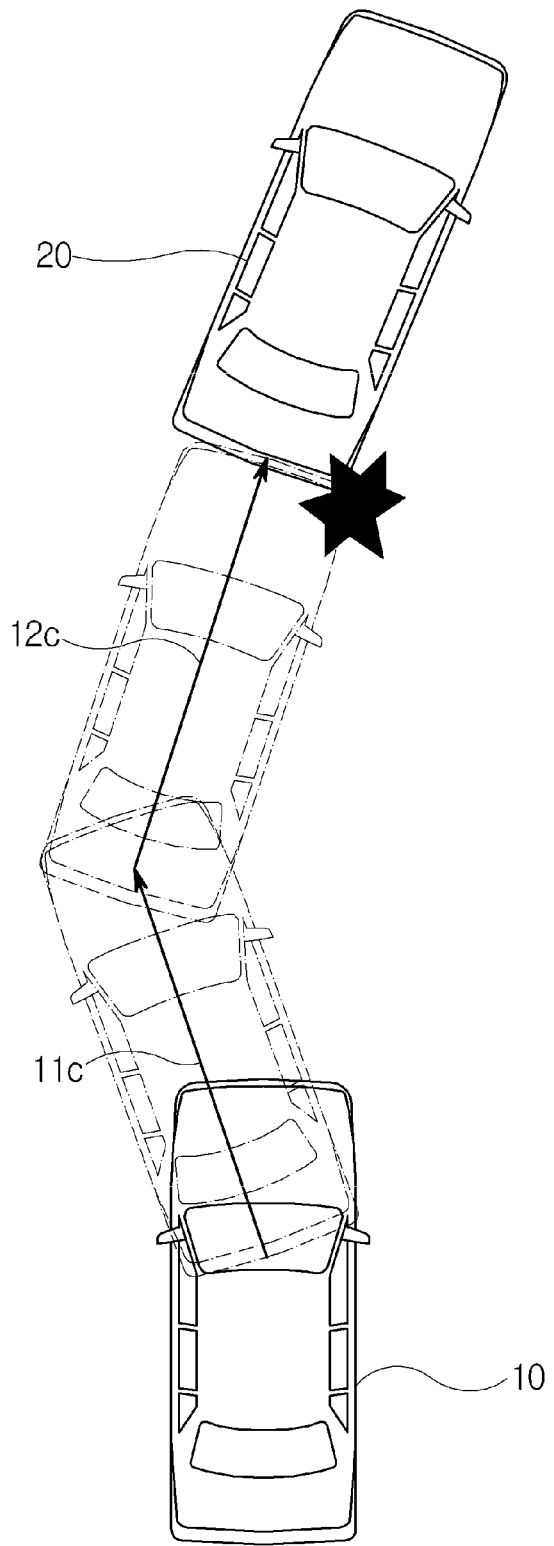

[Fig. 4A]
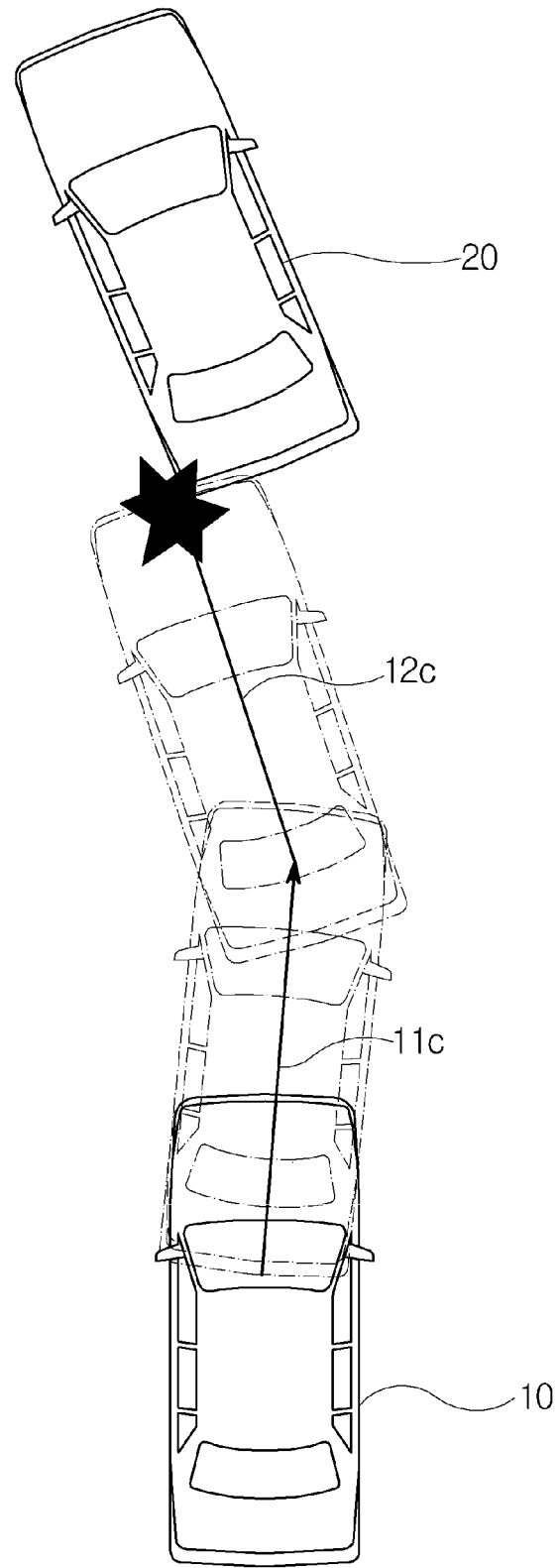

[Fig. 4B]
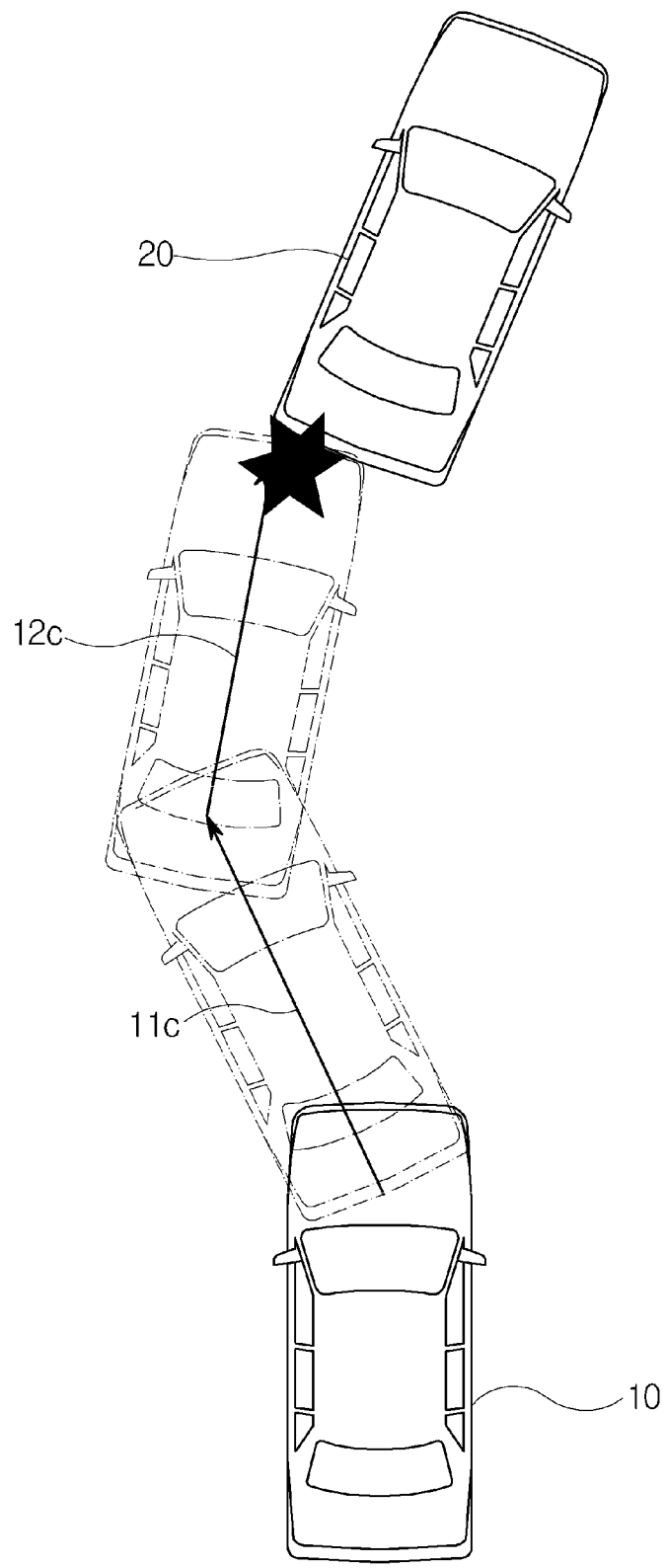

[Fig. 5]
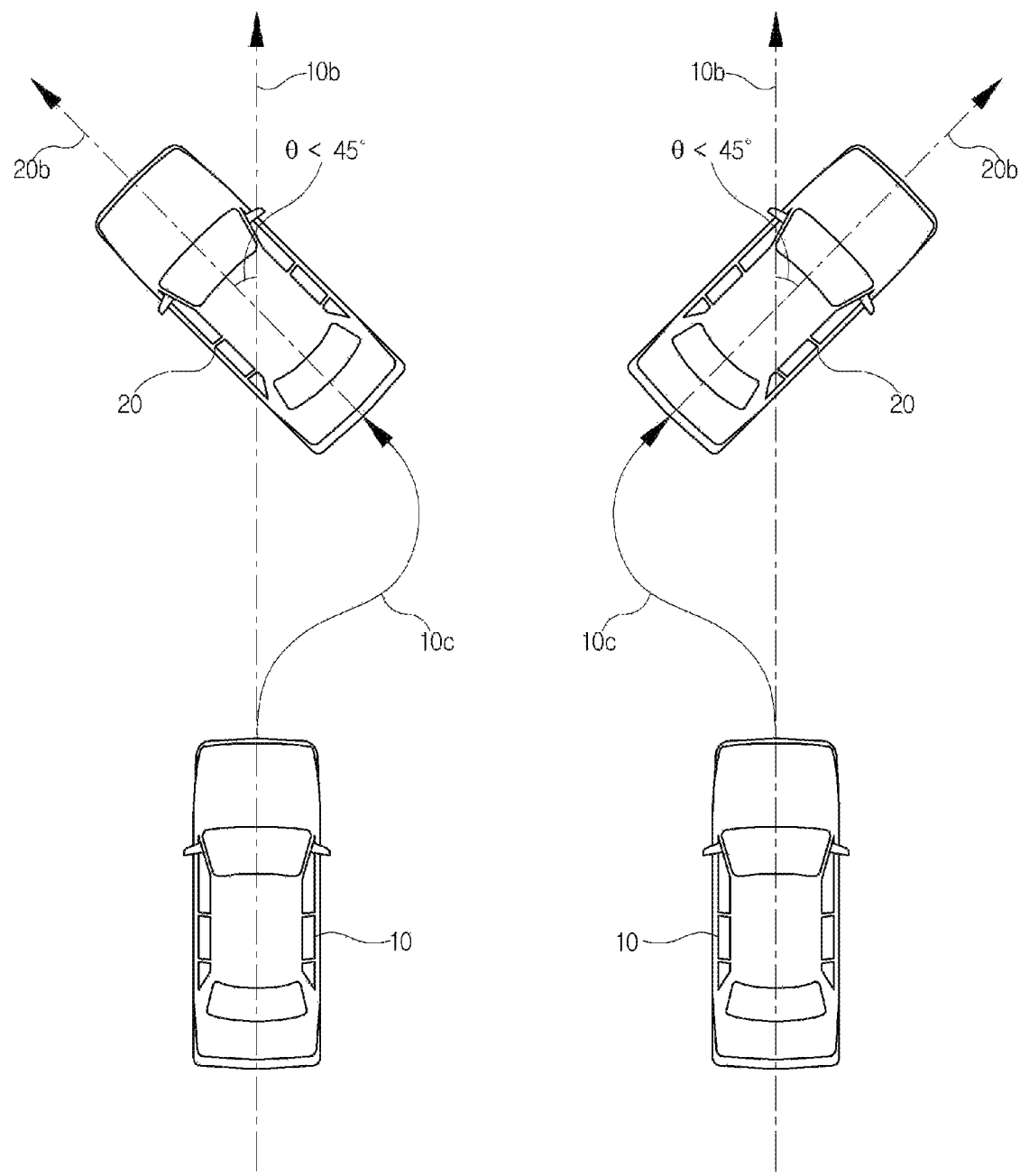

[Fig. 6]
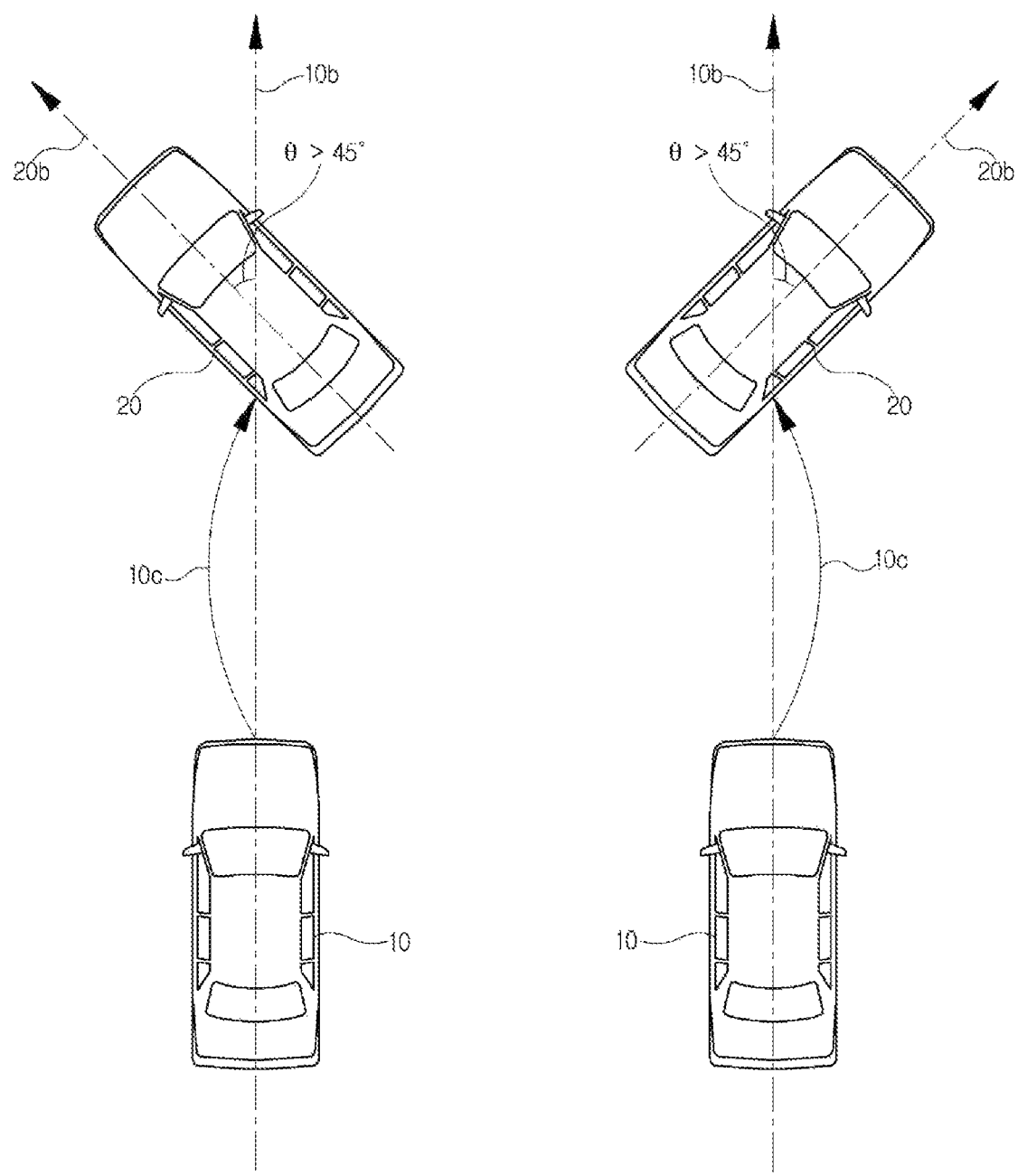

[Fig. 7]
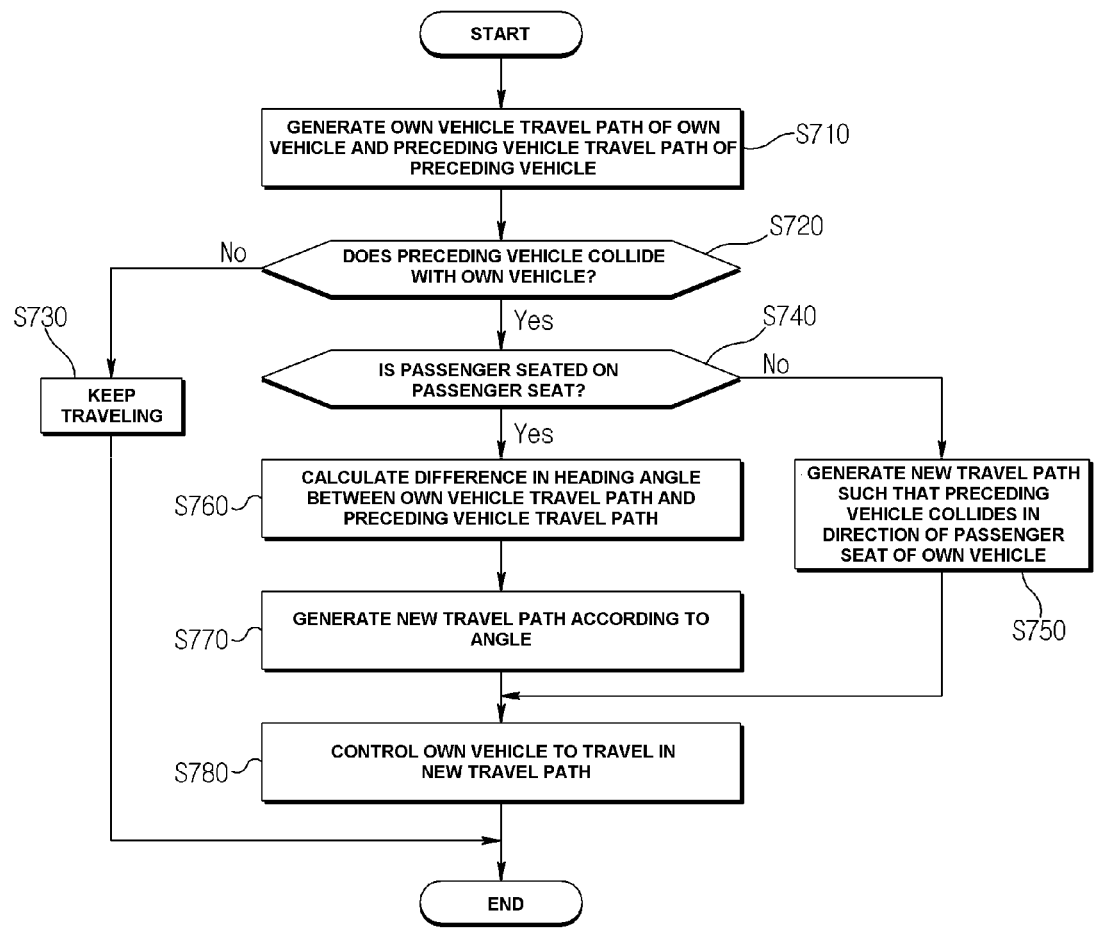

IMPACT-ABSORBING APPARATUS AND METHOD FOR VEHICLE

CROSS-REFERENCE(S) TO RELATED APPLICATIONS

This application claims priority to Korean Patent Application No(s). 10-2016-0118400 (and 10-2016-0129606), filed on Sep. 13, 2016, (and Oct. 7, 2016, respectively,) the disclosures of which are incorporated herein by reference in their entirety.

BACKGROUND OF THE DISCLOSURE

Field of the Disclosure

Exemplary embodiments of the present disclosure relate to an impact-absorbing apparatus and method for a vehicle, and more particularly, to an impact-absorbing apparatus and method for a vehicle, capable of absorbing an impact with a preceding vehicle by generating a new travel path of an own vehicle when it is impossible to prevent a collision between the own vehicle and the preceding vehicle in an automatic emergency brake (AEB) system of the own vehicle.

Description of the Related Art

In recent years, there has been developed a smart cruise control (hereinafter, referred to as "SCC") system that allows a vehicle to travel while maintaining a safe distance from a preceding vehicle through deceleration or acceleration by detecting a distance from the preceding vehicle using radar included in the vehicle and controlling a throttle and a brake.

The SCC system is a system that prevents a collision between a vehicle and a preceding vehicle by generating a braking force to reduce the speed of the vehicle and informing a driver of a collision possibility with the preceding vehicle when the distance between the vehicle and the preceding vehicle is less than or equal to a reference distance. However, the SCC system is problematic in that it does not relieve an impact in the event of an accident since it performs only a passive function such as sounding an alarm in the event of a collision and does not control a steering or suspension system or the like even though there is a possibility of collision. In addition, there is a problem in that the SCC system does not reduce an impulse applied to a driver and a passenger since it does not consider whether or not the passenger gets into a vehicle.

SUMMARY OF THE DISCLOSURE

An object of the present disclosure is to provide an impact-absorbing apparatus and method for a vehicle, capable of absorbing a vehicle impact by maximizing an impact area while driving an automatic emergency brake (AEB) system when it is impossible to prevent a collision between an own vehicle and a preceding vehicle.

Another object of the present disclosure is to minimize an impulse applied to a driver according to whether or not a passenger gets into a vehicle.

A still another object of the present disclosure is to minimize an impulse by generating a new own vehicle travel path based on a difference in angle between a travel path of an own vehicle and a travel path of a preceding vehicle.

A yet another object of the present disclosure is to minimize an impulse by generating a new travel path of an own vehicle based on whether or not a passenger is seated on a passenger set.

A further object of the present disclosure is to control an own vehicle through a steering system and one-sided braking such that the own vehicle travels in a new travel path.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, there is provided an impact-absorbing apparatus for a vehicle. The impact-absorbing apparatus includes a path generation unit configured to generate an own vehicle travel path of an own vehicle, based on a speed and travel direction of the own vehicle, and a preceding vehicle travel path of a preceding vehicle, based on a speed and travel direction of the preceding vehicle, and a collision determination unit configured to determine whether or not the own vehicle collides with the preceding vehicle, based on the own vehicle travel path and the preceding vehicle travel path, wherein when it is impossible to avoid the collision between the own vehicle and the preceding vehicle, the path generation unit generates a new travel path by comparing the own vehicle travel path with the preceding vehicle travel path in order to reduce an impulse applied to a driver due to the collision between the own vehicle and the preceding vehicle.

The impact-absorbing apparatus may further include a passenger detection unit configured to detect whether or not a passenger is seated on a passenger seat of the own vehicle, and when the passenger is not seated on the passenger seat of the own vehicle, the path generation unit may generate the new travel path that allows a front surface located in a direction of the passenger seat of the own vehicle to collide with the preceding vehicle.

The path generation unit may generate the new travel path such that the own vehicle begins to travel in a direction opposite to the direction in which the preceding vehicle travel path is generate, and the new travel path may be a travel path in which an impact area between a front surface of the own vehicle and a rear surface of the preceding vehicle is increased.

The path generation unit may generate the new travel path when the preceding vehicle travel path is generated in one direction with respect to the own vehicle travel path, and the new travel path may include a first sub-path that allows the own vehicle to travel forward in the other direction opposite to the one direction with respect to the own vehicle travel path, and a second sub-path that allows the own vehicle to travel forward in the one direction with respect to the own vehicle travel path.

The impact-absorbing apparatus may further include a controller configured to control at least one of braking and steering systems of the own vehicle to control the own vehicle such that the own vehicle travels in the new travel path, when it is intended that the travel direction of the own vehicle is changed to the first sub-path, the controller may control a braking amount of a first wheel of the own vehicle to be greater than a braking amount of a second wheel of the own vehicle, and the first wheel may be disposed in the other direction of the own vehicle while the second wheel may be disposed in the one direction of the own vehicle.

When it is intended that the travel direction of the own vehicle is changed to the second sub-path, the controller may control the braking amount of the second wheel to be greater than the braking amount of the first wheel.

The controller may control the steering system so as to match with the braking amount of the first wheel and the braking amount of the second wheel.

The path generation unit may calculate a difference in heading angle between the own vehicle travel path and the preceding vehicle travel path, and when the difference in heading angle is less than a predetermined angle, the path generation unit may generate the new travel path such that an impact area between the own vehicle and a rear surface of the preceding vehicle is increased compared to when the own vehicle travels in the own vehicle travel path.

The path generation unit may calculate a difference in heading angle between the own vehicle travel path and the preceding vehicle travel path, and when the difference in heading angle is equal to or more than a predetermined angle, the path generation unit may generate the new travel path such that an impact area between the own vehicle and a side surface of the preceding vehicle is increased compared to when the own vehicle travels in the own vehicle travel path.

The impact-absorbing apparatus may further include a controller configured to control at least one of braking and steering systems of the own vehicle to control the own vehicle such that the own vehicle travels in the new travel path, and the controller may control braking amounts of both wheels of the own vehicle in a different manner such that the own vehicle travels in the new travel path.

The controller may apply the same braking force to the both wheels so as to have a first total braking amount before the new travel path is generated, the controller may apply different braking forces to the both wheels so as to have a second total braking amount based on the new travel path after the new travel path is generated, and the first total braking amount may be equal to the second total braking amount.

In accordance with another aspect of the present disclosure, there is provided an impact-absorbing apparatus for a vehicle. The impact-absorbing apparatus includes a path generation unit configured to generate an own vehicle travel path of an own vehicle, based on a speed and travel direction of the own vehicle, and a preceding vehicle travel path of a preceding vehicle, based on a speed and travel direction of the preceding vehicle, a passenger detection unit configured to detect whether or not a passenger is seated on a passenger seat of the own vehicle, and a collision determination unit configured to determine whether or not the own vehicle collides with the preceding vehicle, based on the own vehicle travel path and the preceding vehicle travel path, wherein when it is impossible to avoid the collision between the own vehicle and the preceding vehicle, the path generation unit generates a new travel path based on the own vehicle travel path, the preceding vehicle travel path, and the whether or not a passenger is seated on a passenger seat.

When the passenger is not seated on the passenger seat of the own vehicle, the path generation unit may generate the new travel path that allows a front surface located in a direction of the passenger seat of the own vehicle to collide with the preceding vehicle.

The path generation unit may generate the new travel path when the preceding vehicle travel path is generated in one direction with respect to the own vehicle travel path, and the new travel path may include a first sub-path that allows the own vehicle to travel forward in the other direction opposite to the one direction with respect to the own vehicle travel path, and a second sub-path that allows the own vehicle to travel forward in the one direction with respect to the own vehicle travel path.

The impact-absorbing apparatus may further include a controller configured to control at least one of braking and steering systems of the own vehicle to control the own vehicle such that the own vehicle travels in the new travel path, when it is intended that the travel direction of the own vehicle is changed to the first sub-path, the controller may control a braking amount of a first wheel of the own vehicle to be greater than a braking amount of a second wheel of the own vehicle, and the first wheel may be disposed in the other direction of the own vehicle while the second wheel may be disposed in the one direction of the own vehicle.

When it is intended that the travel direction of the own vehicle is changed to the second sub-path, the controller may control the braking amount of the second wheel to be greater than the braking amount of the first wheel.

When it is intended that the travel direction of the own vehicle is changed to the second sub-path, the controller may control braking amounts of the first and second wheels, when the passenger is seated on the passenger seat, and braking amounts of the first and second wheels, when the passenger is not seated on the passenger seat, to be different from each other.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a block diagram illustrating an impact-absorbing apparatus for a vehicle according to an embodiment of the present disclosure;

FIG. 2 is a view illustrating travel directions of own and preceding vehicles;

FIGS. 3A and 3B are views illustrating a new travel path of the own vehicle for maximizing an impact area when a passenger is seated on the passenger seat of the own vehicle;

FIGS. 4A and 4B are views illustrating a new travel path of the own vehicle for maximizing an impact area when a passenger is not seated on the passenger seat of the own vehicle;

FIG. 5 is a view illustrating a new travel path of the own vehicle when the difference in angle between the travel path of the own vehicle and the travel path of the preceding vehicle is less than 45°;

FIG. 6 is a view illustrating a new travel path of the own vehicle when the difference in angle between the travel path of the own vehicle and the travel path of the preceding vehicle is equal to or more than 45°; and FIG. 7 is a flowchart for explaining an impact-absorbing method for a vehicle according to another embodiment of the present disclosure.

DESCRIPTION OF SPECIFIC EMBODIMENTS

Exemplary embodiments of the present disclosure will be described below in more detail with reference to the accompanying drawings so as to be implemented by a person of ordinary skill in the art. The present disclosure may, however, be embodied in different forms and should not be construed as limited to the embodiments set forth herein.

In certain embodiments, the description irrelevant to the present disclosure may be omitted to avoid obscuring appreciation of the disclosure. Throughout the disclosure, like reference numerals refer to like parts throughout the various figures and embodiments of the present disclosure.

In addition, it will be understood that when a component is referred to as being "comprising" any component, it does not exclude other components, but can further comprises the other components unless otherwise specified. The terminology used in the specification of the present disclosure is for the purpose of describing particular embodiments only and is not intended to limit the disclosure. Unless otherwise defined, all terms, including technical and scientific terms, used herein have the same meaning as commonly understood by one of ordinary skill in the art.

FIG. 1 is a block diagram illustrating an impact-absorbing apparatus for a vehicle according to an embodiment of the present disclosure. FIG. 2 is a view illustrating travel directions of own and preceding vehicles.

Referring to FIG. 1, the impact-absorbing apparatus for a vehicle, which is designated by reference numeral 100, according to the embodiment of the present disclosure may include a path generation unit 110, a collision determination unit 120, a passenger detection unit 130, and a controller 150.

Referring to FIGS. 1 and 2, the path generation unit 110 may generate an own vehicle travel path 10b of an own vehicle 10 and a preceding vehicle travel path 20b of a preceding vehicle 20. In detail, the path generation unit 110 may generate the own vehicle travel path 10b of the own vehicle 10 by continuously tracing a speed and travel direction 10a of the own vehicle 10. In this case, the path generation unit 110 may continuously update the own vehicle travel path 10b according to the speed and travel direction 10a of the own vehicle 10. The path generation unit 110 may generate the preceding vehicle travel path 20b of the preceding vehicle 20 by continuously tracing a speed and travel direction 20a of the preceding vehicle 20. In this case, the path generation unit 110 may continuously update the preceding vehicle travel path 20b according to the speed and travel direction 20a of the preceding vehicle 20. Here, the path generation unit 110 may generate the own vehicle travel path 10b of the own vehicle 10 through the steering system and wheel direction of the own vehicle 10 and the like, and may generate the preceding vehicle travel path 20b of the preceding vehicle 20 through sensors such as cameras and radar included in the own vehicle 10. The path generation unit 110 may provide the generated own vehicle travel path 10b and preceding vehicle travel path 20b to the collision determination unit 120. When it is impossible to avoid a collision between the own vehicle 10 and the preceding vehicle 20, the path generation unit 110 may generate a new travel path of the own vehicle 10 such that an impact area is further increased than the own vehicle travel path 10b of the own vehicle 10 based on the information transferred from the collision determination unit 120 and the passenger detection unit 130 which will be described later. That is, the path generation unit 110 may generate a new travel path in which an impulse is less applied to a driver, compared to the travel path before a collision occurs. The specific method of generating the new travel path will be described later. The path generation unit 110 may provide the new travel path to the controller 150.

The path generation unit 110 may generate the preceding vehicle travel path 20b by continuously tracing the speed and travel direction 20a of the preceding vehicle 20 when the lane of the preceding vehicle 20 is changed from a second lane to a first lane. Meanwhile, the path generation unit 110 may generate the preceding vehicle travel path 20b by continuously tracing the speed and travel direction 20a of the preceding vehicle 20 when the lane of the preceding vehicle 20 is changed from the second lane to a third lane.

The collision determination unit 120 may determine whether or not the own vehicle 10 collides with the preceding vehicle 20 through the own vehicle travel path 10b and the preceding vehicle travel path 20b which are provided from the path generation unit 110. In detail, when an automatic emergency brake (AEB) system of the own vehicle 10 is driven, the AEB system may determine whether or not the own vehicle 10 collides with the preceding vehicle 20. In this case, the AEB system operates the brake of the own vehicle 10 so that the own vehicle 10 brakes, when the collision between the own vehicle 10 and the preceding vehicle 20 is expected. However, the AEB system may also not prevent the collision between the own vehicle 10 and the preceding vehicle 20. The collision determination unit 120 may provide whether or not the own vehicle 10 collides with the preceding vehicle 20 to the path generation unit 110.

The passenger detection unit 130 may detect whether or not a passenger is seated on the passenger seat of the own vehicle 10. The passenger detection unit 130 may detect whether or not the passenger is seated on the passenger seat by detecting the weight applied to the passenger seat using a weight sensor. However, the method of determining whether or not the passenger is seated on the passenger seat by the passenger detection unit 130 is not especially limited. The passenger detection unit 130 provides the result of detection of whether or not the passenger is seated on the passenger seat to the path generation unit 110.

The controller 150 may control the own vehicle 10 based on the new travel path provided from the path generation unit 110. The controller 150 may control at least one of braking and steering systems to control the own vehicle 10 such that the own vehicle 10 travels in the new travel path. For example, the controller 150 may control the steering of the own vehicle 10 such that the own vehicle 10 travels along the new travel path. For another example, the controller 150 may adjust a direction of progress of the own vehicle 10 by controlling braking forces applied to both wheels of the own vehicle 10. Thus, the own vehicle 10 may travel along the new travel path.

FIGS. 3A and 3B are views illustrating the new travel path of the own vehicle for maximizing an impact area when the passenger is seated on the passenger seat of the own vehicle. FIGS. 3A and 3B are views for explaining that the own vehicle is controlled in a different manner according to whether the travel path of the preceding vehicle is to the left or right of the travel direction of the own vehicle. In FIG. 3B, an overlapped description with FIG. 3A will be omitted.

Referring to FIGS. 1, 2, and 3A, the preceding vehicle travel path 20b may be formed to the left of the own vehicle travel path 10b. When a passenger is seated on the passenger seat of the own vehicle 10, the own vehicle 10 may be controlled such that the impulse applied to both of the driver and the passenger is reduced. When it is impossible to avoid a collision between the own vehicle 10 and the preceding vehicle 20, the path generation unit 110 may a new travel path 10c of the own vehicle 10 for maximizing an impact area between the own vehicle 10 and the preceding vehicle 20. In this case, by maximizing the impact area between the own vehicle 10 and the preceding vehicle 20, it is possible to reduce the impulse applied to the driver during collision. When the preceding vehicle travel path 20b is formed to the left of the own vehicle travel path 10b, the path generation unit 110 may generate a new travel path 10c to the right of the own vehicle travel path 10b. The path generation unit 110 may generate the new travel path 10c that allows the front surface of the own vehicle 10 collides with the rear surface of the preceding vehicle 20. For example, the front surface of the own vehicle 10 may mean an outer surface of a bumper attached in the front of the own vehicle, and the rear surface of the preceding vehicle 20 may mean an outer surface of a bumper attached in the rear of the preceding vehicle. That is, in order to minimize the impulse applied to the driver, the path generation unit 110 may generate the new travel path 10c such that the outer surface of the front bumper of the own vehicle 10 comes into maximum contact with the outer surface of the rear bumper of the preceding vehicle 20.

In detail, the path generation unit 110 may generate a first sub-path 11c that allows the own vehicle 10 to be directed toward the right front of the own vehicle travel path 10b. The controller 150 may control braking amounts of both wheels of the own vehicle 10 in order for the own vehicle 10 to travel in the first sub-path 11c. The controller 150 may control a braking amount of a first wheel disposed to the right of the own vehicle 10 to be greater than a braking amount of a second wheel disposed to the left of the own vehicle 10. Then, the path generation unit 110 may generate a second sub-path 12c that allows the own vehicle 10 to be directed toward the left front of the own vehicle travel path 10b. The controller 150 may control braking amounts of both wheels of the own vehicle 10 in order for the own vehicle 10 to travel in the second sub-path 12c. The controller 150 may control a braking amount of a second wheel of the own vehicle 10 to be greater than a braking amount of a first wheel. The second sub-path 12c may be a path leading to the first sub-path 11c. The new travel path 10c may include the first and second sub-paths 11c and 12c.

Referring to FIGS. 1, 2, and 3B, the preceding vehicle travel path 20b may be formed to the right of the own vehicle travel path 10b. When a passenger is seated on the passenger seat of the own vehicle 10, the own vehicle 10 may be controlled such that the impulse applied to both of the driver and the passenger is reduced. When the preceding vehicle travel path 20b is formed to the right of the own vehicle travel path 10b, the path generation unit 110 may generate a new travel path 10c to the left of the own vehicle travel path 10b.

In detail, the path generation unit 110 may generate a first sub-path 11c that allows the own vehicle 10 to be directed toward the left front of the own vehicle travel path 10b. The controller 150 may control braking amounts of both wheels of the own vehicle 10 in order for the own vehicle 10 to travel in the first sub-path 11c. The controller 150 may control a braking amount of a first wheel disposed to the right of the own vehicle 10 to be smaller than a braking amount of a second wheel disposed to the left of the own vehicle 10. Then, the path generation unit 110 may generate a second sub-path 12c that allows the own vehicle 10 to be directed toward the right front of the own vehicle travel path 10b. The controller 150 may control braking amounts of both wheels of the own vehicle 10 in order for the own vehicle 10 to travel in the second sub-path 12c. The controller 150 may control a braking amount of a second wheel of the own vehicle 10 to be smaller than a braking amount of a first wheel. The second sub-path 12c may be a path leading to the first sub-path 11c. The new travel path 10c may include the first and second sub-paths 11c and 12c.

Consequently, the path generation unit 110 may generate the new travel path 10c such that the own vehicle 10 travels in a direction opposite to the direction in which the preceding vehicle travel path 20b is generated. When the preceding vehicle travel path 20b is generated in one direction with respect to the own vehicle travel path 10b, the path generation unit 110 may generate the first sub-path 11c that allows the own vehicle 10 to travel forward in the other direction opposite to the one direction, and the second sub-path 12c that allows the own vehicle 10 to travel forward in the one direction. When it is intended that the travel direction of the own vehicle 10 is changed to the first sub-path 11c, the controller 150 may control the braking amount of the first wheel to be greater than the braking amount of the second wheel. In this case, the first wheel may be disposed in the other direction of the own vehicle 10, and the second wheel may be disposed in the one direction of the own vehicle 10. Then, when it is intended that the travel direction of the own vehicle 10 is changed to the second sub-path 12c, the controller 150 may control the braking amount of the second wheel to be greater than the braking amount of the first wheel. The first and second sub-paths may vary depending on the posture, position, or the like of the preceding vehicle 20. The controller 150 may additionally control the steering system so as to match with the braking amounts of the first and second wheels.

In addition, the controller 150 may control the braking amounts of both wheels in a different manner such that the own vehicle 10 travels along the new travel path 10c. In this case, the total braking amount, which is identically applied to both wheels so as to have a first total braking amount before the new travel path 10c is generated, may be equal to the total braking amount, which is differently applied to both wheels so as to have a second total braking amount based on the new travel path.

In addition, when the own vehicle 10 is a front-wheel-drive vehicle, the controller 150 may control the braking amounts of both wheels, disposed in the front of the own vehicle 10 in a different manner, based on the new travel path 10c of the own vehicle 10. On the other hand, when the own vehicle 10 is a rear-wheel-drive vehicle, the controller 150 may control the braking amounts of both wheels, disposed in the rear of the own vehicle 10 in a different manner, based on the new travel path 10c of the own vehicle 10. In addition, when the own vehicle 10 is a four-wheel-drive vehicle, the controller 150 may control the braking amounts of both wheels, disposed in the front and rear of the own vehicle 10 in a different manner, based on the new travel path 10c of the own vehicle 10.

FIGS. 4A and 4B are views illustrating the new travel path of the own vehicle for maximizing an impact area when the passenger is not seated on the passenger seat of the own vehicle. FIGS. 4A and 4B are views for explaining that the own vehicle is controlled in a different manner according to whether the travel path of the preceding vehicle is to the left or right of the travel direction of the own vehicle. In FIG. 4B, an overlapped description with FIG. 3A will be omitted.

Referring to FIGS. 1, 2, and 4A, the path generation unit 110 may check whether or not a passenger is seated on the passenger seat of the own vehicle 10, based on the result of detection input from the passenger detection unit 130 about whether or not the passenger is seated on the passenger seat. When it is impossible to avoid the collision between the own vehicle 10 and the preceding vehicle 20 and the passenger is not seated on the passenger seat of the own vehicle 10, the path generation unit 110 may generate a new travel path 10c of the own vehicle 10 such that the preceding vehicle 20 collides with the front surface located in the direction of the passenger seat of the own vehicle 10. That is, when the passenger is not seated on the passenger seat of the own vehicle 10, it is possible to control the own vehicle 10 such that the impulse applied to the driver is reduced. The front surface may mean an outer surface of a bumper attached in the front of the own vehicle, and the front surface located in the direction of the passenger seat may mean a surface which is in the same direction as the direction of the passenger seat on the outer surface of the bumper. For example, when the passenger seat is located to the right in the front of the vehicle, the front surface located in the direction of the passenger seat may mean a right surface on the front surface of the vehicle. When the passenger seat is located to the left in the front of the vehicle, the front surface located in the direction of the passenger seat may mean a left surface on the front surface of the vehicle.

When the preceding vehicle travel path 20b is formed to the left of the own vehicle travel path, the path generation unit 110 may generate the new travel path 10c of the own vehicle 10 to be a path in which the front surface located in the direction of the passenger seat of the own vehicle 10 collides with the rear surface of the preceding vehicle 20.

In detail, the path generation unit 110 may generate a first sub-path 11c that allows the own vehicle 10 to be directed toward the right front of the own vehicle travel path 10b. The controller 150 may control a braking amount of a first wheel disposed to the right of the own vehicle 10 to be greater than a braking amount of a second wheel disposed to the left of the own vehicle 10. The own vehicle 10 may travel in the first sub-path 11c. Then, the path generation unit 110 may generate a second sub-path 12c that allows the own vehicle 10 to be directed toward the left front of the own vehicle travel path 10b. The controller 150 may control a braking amount of a second wheel to be greater than a braking amount of a first wheel. The own vehicle 10 may travel in the second sub-path 12c. That is, the path generation unit may generate the new travel path 10c including the first and second sub-paths 11c and 12c.

Referring to FIGS. 1, 2, and 4B, the preceding vehicle travel path 20b may be formed to the right of the own vehicle travel path 10b. When the passenger is not seated on the passenger seat of the own vehicle 10, it is possible to control the own vehicle 10 such that the impulse applied to the driver is reduced.

When the preceding vehicle travel path 20b is formed to the right of the own vehicle travel path, the path generation unit 110 may generate the new travel path 10c of the own vehicle 10 to be a path in which the front surface located in the direction of the passenger seat of the own vehicle 10 collides with the rear surface of the preceding vehicle 20. In detail, the path generation unit 110 may generate a first sub-path 11c that allows the own vehicle 10 to be directed toward the left front of the own vehicle travel path 10b. The controller 150 may control a braking amount of a first wheel disposed to the right of the own vehicle 10 to be smaller than a braking amount of a second wheel disposed to the left of the own vehicle 10. The own vehicle 10 may travel in the first sub-path 11c. Then, the path generation unit 110 may generate a second sub-path 12c that allows the own vehicle 10 to be directed toward the right front of the own vehicle travel path 10b. The controller 150 may control a braking amount of a second wheel to be smaller than a braking amount of a first wheel. The own vehicle 10 may travel in the second sub-path 12c. The second sub-path 12c may be a path leading to the first sub-path 11c. The new travel path 10c may include the first and second sub-paths 11c and 12c.

FIG. 5 is a view illustrating the new travel path of the own vehicle when the difference in angle between the own vehicle travel path and the preceding vehicle travel path is less than 45°. An overlapped content will be omitted for convenience of description.

Referring to FIGS. 1 and 5, the path generation unit 110 may calculate a difference in heading angle $\theta$ between the own vehicle travel path 10b of the own vehicle 10 and the preceding vehicle travel path 20b of the preceding vehicle 20. When the difference in heading angle $\theta$ between the own vehicle travel path 10b and the preceding vehicle travel path 20b is less than a predetermined angle as the result of calculation, the path generation unit 110 may generate a new travel path 10c of the own vehicle 10 such that the front surface of the own vehicle 10 collides with the rear surface of the preceding vehicle 20. For example, the predetermined angle may be an angle of 45°.

In the present embodiment, when the difference in heading angle $\theta$ between the own vehicle travel path 10b and the preceding vehicle travel path 20b is less than the predetermined angle, it may be determined that the collision between the front surface of the own vehicle 10 and the rear surface of the preceding vehicle 20 is to minimize the impulse applied to the driver in the path generation unit 110. In other words, when the difference in heading angle $\theta$ between the own vehicle travel path 10b and the preceding vehicle travel path 20b is relatively small, the path generation unit 110 may generate a new travel path 10c in which the front surface of the own vehicle 10 collides with the rear surface of the preceding vehicle 20, in order to maximize a contact area due to the collision between the own vehicle 10 and the preceding vehicle 20.

FIG. 6 is a view illustrating the new travel path of the own vehicle when the difference in angle between the own vehicle travel path and the preceding vehicle travel path is equal to or more than 45°. An overlapped content will be omitted for convenience of description.

Referring to FIGS. 1 and 6, the path generation unit 110 may calculate a difference in heading angle $\theta$ between the own vehicle travel path 10b of the own vehicle 10 and the preceding vehicle travel path 20b of the preceding vehicle 20. When the difference in heading angle $\theta$ between the own vehicle travel path 10b and the preceding vehicle travel path 20b is equal to or more than a predetermined angle as the result of calculation, the path generation unit 110 may generate a new travel path 10c of the own vehicle 10 such that the front surface of the own vehicle 10 collides with the side surface of the preceding vehicle 20. For example, the predetermined angle may be an angle of 45°.

In the present embodiment, when the difference in heading angle $\theta$ between the own vehicle travel path 10b and the preceding vehicle travel path 20b is equal to or more than the predetermined angle, it may be determined that the collision between the front surface of the own vehicle 10 and the side surface of the preceding vehicle 20 is to minimize the impulse applied to the driver in the path generation unit 110. In other words, when the difference in heading angle $\theta$ between the own vehicle travel path 10b and the preceding vehicle travel path 20b is relatively great, the path generation unit 110 may generate a new travel path 10c in which the front surface of the own vehicle 10 collides with the side surface of the preceding vehicle 20, in order to maximize a contact area due to the collision between the own vehicle 10 and the preceding vehicle 20.

FIG. 7 is a flowchart for explaining an impact-absorbing method for a vehicle according to another embodiment of the present disclosure.

Referring to FIGS. 1, 2, and 7, a path generation unit 110 generates travel paths of own and preceding vehicles 10 and 20 (S710). In detail, the path generation unit 110 checks a speed and travel direction 10a of the own vehicle 10. The path generation unit 110 generates an own vehicle travel path 10b of the own vehicle 10 by continuously tracing the speed and travel direction 10a of the own vehicle 10. In this case, the path generation unit 110 continuously updates the own vehicle travel path 10b according to the traveling of the own vehicle 10. The path generation unit 110 checks a speed and travel direction 20a of the preceding vehicle 20. The path generation unit 110 generates a preceding vehicle travel path 20b of the preceding vehicle 20 by continuously tracing the speed and travel direction 20a of the preceding vehicle 20. In this case, the path generation unit 110 continuously updates the preceding vehicle travel path 20b according to the traveling of the preceding vehicle 20.

Next, a collision determination unit 120 determines whether or not the own vehicle 10 collides with the preceding vehicle 20 (S720). When it is determined that the own vehicle 10 does not collide with the preceding vehicle 20 as the result of determination of whether or not the own vehicle 10 collides with the preceding vehicle 20 in the collision determination unit 120, a controller 150 controls the own vehicle 10 to keep traveling according to the operation of a driver (S730).

Meanwhile, when it is determined that it is impossible to avoid the collision between the own vehicle 10 and the preceding vehicle 20 as the result of determination of whether or not the own vehicle 10 collides with the preceding vehicle 20 in the collision determination unit 120, a passenger detection unit 130 detects whether or not a passenger is seated on the passenger seat of the own vehicle 10 (S740). When the passenger is determined to be seated on the passenger seat of the own vehicle 10 as the result of determination, the path generation unit 110 generates a new travel path of the own vehicle 10 (S750). In this case, the new travel path is a path in which the preceding vehicle 20 collides with the front surface located in the direction of the passenger seat of the own vehicle 10, in order to reduce the impulse applied to the driver when the own vehicle 10 collides with the preceding vehicle 20.

When the passenger is determined to be seated on the passenger seat of the own vehicle 10 as the result of detection, the path generation unit calculates a difference in heading angle θ between the own vehicle travel path 10b of the own vehicle 10 and the preceding vehicle travel path 20b of the preceding vehicle 20 (S760).

Next, the path generation unit 110 generates a new travel path according to the difference in heading angle θ between the own vehicle travel path 10b and the preceding vehicle travel path 20b. In detail, when the difference in heading angle θ between the own vehicle travel path 10b and the preceding vehicle travel path 20b is less than an angle of 45°, the new travel path of the own vehicle 10 is generated such that the front surface of the own vehicle 10 collides with the rear surface of the preceding vehicle 20 in order to increase an impact area.

When the difference in heading angle θ between the own vehicle travel path 10b and the preceding vehicle travel path 20b is equal to or more than an angle of 45°, the new travel path of the own vehicle 10 is generated such that the own vehicle 10 collides with the side surface of the preceding vehicle 20 in order to increase an impact area (S770).

Next, the controller 150 controls the own vehicle 10 to travel along the new travel path 10c (S780). In this case, the controller 150 may control at least one of braking and steering systems to control the own vehicle 10 such that the own vehicle 10 travels in the new travel path 10c.

As described above, when it is impossible to avoid the collision between the own vehicle and the preceding vehicle in the automatic emergency brake (AEB) system of the own vehicle, the present disclosure can implement the impact-absorbing apparatus and method for a vehicle, which absorb a vehicle impact by generating the new travel path of the own vehicle.

As is apparent from the above description, the present disclosure can minimize an impulse by maximizing an impact area when it is impossible to prevent a collision between an own vehicle and a preceding vehicle in an automatic emergency brake (AEB) system of the own vehicle.

In addition, it is possible to maximize an impact area by generating a new own vehicle travel path based on a difference in angle between a travel path of an own vehicle and a travel path of a preceding vehicle. Furthermore, it is possible to control the own vehicle by controlling braking forces applied both wheels based on the new travel path so as to reduce the impulse applied to a driver due to a collision between the own vehicle and the preceding vehicle.

While the present disclosure has been particularly shown and described with reference to exemplary embodiments thereof, it will be understood by those skilled in the art that various changes in form and details may be made therein without departing from the spirit and scope of the disclosure as defined by the appended claims. The exemplary embodiments should be considered in descriptive sense only and not for purposes of limitation. Therefore, the scope of the disclosure is defined not by the detailed description of the disclosure but by the appended claims, and all differences within the scope will be construed as being included in the present disclosure.

What is claimed is:

1. An impact-absorbing apparatus for a vehicle, comprising:
 a path generation unit configured to generate an own vehicle travel path of an own vehicle, based on a speed and travel direction of the own vehicle, and a preceding vehicle travel path of a preceding vehicle, based on a speed and travel direction of the preceding vehicle;
 a collision determination unit configured to determine whether or not a collision between the own vehicle and the preceding vehicle is expected, based on the own vehicle travel path and the preceding vehicle travel path; and
 a controller configured to control at least one of braking and steering systems of the own vehicle to control the own vehicle such that the own vehicle travels in the new travel path, wherein the controller is further configured to, when the collision determination unit determines that it is impossible to avoid the collision between the own vehicle and the preceding vehicle, control a braking amount of a first wheel of the own vehicle, positioned farther from the preceding vehicle than a second wheel of the own vehicle, to be greater than a braking amount of the second wheel of the own vehicle, positioned closer to the preceding vehicle than the first wheel of the own vehicle, and then change the braking amount of the first wheel of the own vehicle, positioned farther from the preceding vehicle than the second wheelof the own vehicle, to be less than the braking amount of the second wheel of the own vehicle, positioned closer to the preceding vehicle than the first wheel of the own vehicle so that, when it is impossible to avoid the collision between the own vehicle and the preceding vehicle, We own vehicle is controlled to travel in a direction different from the travel direction of the preceding vehicle first and then change the travel direction of the own vehicle toward the preceding vehicle.

2. The impact-absorbing apparatus according to claim 1, wherein:
   the path generation unit calculates a difference in heading angle between the own vehicle travel path and the preceding vehicle travel path; and
   when the difference in heading angle is less than a predetermined angle, the path generation unit generates the new travel path such that an impact area between the own vehicle and a rear surface of the preceding vehicle is increased compared to when the own vehicle travels in the own vehicle travel path.

3. The impact-absorbing apparatus according to claim 1, wherein:
   the path generation unit calculates a difference in heading angle between the own vehicle travel path and the preceding vehicle travel path; and
   when the difference in heading angle is equal to or more than a predetermined angle, the path generation unit generates the new travel path such that an impact area between the own vehicle and a side surface of the preceding vehicle is increased compared to when the own vehicle travels in the own vehicle travel path.

4. An impact-absorbing apparatus for a vehicle, comprising:
   a path generation unit configured to generate an own vehicle travel path of an own vehicle, based on a speed and travel direction of the own vehicle, and a preceding vehicle travel path of a preceding vehicle, based on a speed and travel direction of the preceding vehicle;
   a passenger detection unit configured to detect whether or not a passenger is seated on a front passenger seat of the own vehicle;
   a collision determination unit configured to determine whether or not a collision between the own vehicle and the preceding vehicle is expected, based on the own vehicle travel path and the preceding vehicle travel path; and
   a controller configured to control at least one of braking and steering systems of the own vehicle to control the own vehicle such that the own vehicle travels in the new travel path, wherein the controller is further configured to, when the collision determination unit determines that it is impossible to avoid the collision between the own vehicle and the preceding vehicle and the passenger is seat on the front passenger seat of the own vehicle, control a braking amount of a first wheel of the own vehicle, positioned further from the preceding vehicle than a second wheel of the own vehicle, to be greater than a braking amount of the second wheel of the own vehicle, positioned closer to the preceding vehicle than the first wheel of the own vehicle, and then change the braking amount of the first wheel of the own vehicle, positioned farther from the preceding vehicle then the second wheel of the own vehicle, to be less than the braking amount of the second wheel of the own vehicle, positioned closer to the preceding vehicle than the wheel of the own vehicle, so that,when it is impossible to avoid the collision between the own vehicle and the preceding vehicle, the own vehicle is controlled to travel in a direction different from the travel direction of the preceding vehicle first and then change the travel direction of the own vehicle toward the preceding vehicle.

5. An impact-absorbing method for a vehicle, comprising:
   generating an own vehicle travel path of an own vehicle, based on a speed and travel direction of the own vehicle, and a preceding vehicle travel path of a preceding vehicle, based on a speed and travel direction of the preceding vehicle;
   determining whether or not a collision between and the own vehicle and the preceding vehicle is expected based on the own vehicle travel path and the preceding vehicle travel path; and
   controlling braking and/or steering systems of the own vehicle such that the own vehicle travels in the new travel path, wherein the controlling of the braking and/or steering systems of the own vehicle comprises, when it is determined that it is impossible to avoid the collision between the own vehicle and the preceding vehicle, controlling a braking amount of a first wheel of the own vehicle, positioned farther from the preceding vehicle than a second wheel of the own vehicle, to be greater than a braking amount of the second wheel of the own vehicle, positioned closer to preceding vehicle than the first wheel of the own vehicle, and then changing the braking amount of the first wheel of the own vehicle, positioned father from the preceding vehicle than the second wheel of the own vehicle, to be less than the braking amount of the second wheel of the own vehicle, positioned closer to the preceding vehicle than the first wheel of the own vehicle, so that, when it is impossible to avoid the collision between the own vehicle and the preceding vehicle, the own vehicle is controlled to travel in a direction different from the travel direction of the preceding vehicle first and change the travel direction of the own vehicle toward the preceding vehicle.

6. The impact-absorbing method according to claim 5, wherein the generating a new travel path comprises:
   calculating a difference in heading angle between the own vehicle travel path and the preceding vehicle travel path;
   generating the new travel path such that an impact area between the own vehicle and a rear surface of the preceding vehicle is increased, compared to when the own vehicle travels in the own vehicle travel path, when the difference in heading angle is less than a predetermined angle, the path generation unit; and
   generating the new travel path such that an impact area between the own vehicle and a side surface of the preceding vehicle is increased, compared to when the own vehicle travels in the own vehicle travel path, when the difference in heading angle is equal to or more than the predetermined angle.

* * * * *